United States Patent
Gan et al.

(10) Patent No.: US 11,086,912 B2
(45) Date of Patent: Aug. 10, 2021

(54) AUTOMATIC QUESTIONING AND ANSWERING PROCESSING METHOD AND AUTOMATIC QUESTIONING AND ANSWERING SYSTEM

(71) Applicant: Tencent Technology (Shenzhen) Company Limited, Shenzhen (CN)

(72) Inventors: Jun Gan, Shenzhen (CN); Ke Su, Shenzhen (CN); Mengliang Rao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 156 days.

(21) Appl. No.: 16/387,365

(22) Filed: Apr. 17, 2019

(65) Prior Publication Data

US 2019/0243900 A1 Aug. 8, 2019

Related U.S. Application Data

(63) Continuation of application No. PCT/CN2018/077488, filed on Feb. 28, 2018.

(30) Foreign Application Priority Data

Mar. 3, 2017 (CN) .......................... 201710124146.0

(51) Int. Cl.
*G06F 16/332* (2019.01)
*G06F 16/00* (2019.01)
(Continued)

(52) U.S. Cl.
CPC .......... *G06F 16/3329* (2019.01); *G06F 16/00* (2019.01); *G06F 16/90332* (2019.01); *G06F 40/279* (2020.01); *G06F 40/30* (2020.01)

(58) Field of Classification Search
CPC ....................................................... G06F 40/30
See application file for complete search history.

(56) References Cited

U.S. PATENT DOCUMENTS

| 7,624,007 B2 * | 11/2009 | Bennett | G10L 15/22 |
| | | | 704/9 |
| 2006/0053000 A1 * | 3/2006 | Moldovan | G06F 16/243 |
| | | | 704/9 |

(Continued)

FOREIGN PATENT DOCUMENTS

| CN | 101373532 A | 2/2009 |
| CN | 103019407 A | 4/2013 |

(Continued)

OTHER PUBLICATIONS

Tencent Technology, ISR, PCT/CN2018/077488, Apr. 9, 2018, 2 pgs.

(Continued)

*Primary Examiner* — Shaun Roberts
(74) *Attorney, Agent, or Firm* — Morgan, Lewis & Bockius LLP (57) ABSTRACT

The present disclosure discloses an automatic question-answer (QA) processing method and an automatic QA system. The method includes: obtaining, after receiving a target question text, a target keyword corresponding to the target question text; determining a candidate question text that matches the target keyword; calculating a semantic similarity value between each candidate question text and the target question text; and determining, based on the semantic similarity value, an answer corresponding to the target question text. In the present disclosure, a semantic similarity between a target question text and each question text is considered, to determine an answer to the target question text, improving accuracy of automatic QA processing.

17 Claims, 2 Drawing Sheets

(51) Int. Cl.
*G06F 40/30* (2020.01)
*G06F 40/279* (2020.01)
*G06F 16/9032* (2019.01)

(56) References Cited

U.S. PATENT DOCUMENTS

| | | | | |
|---|---|---|---|---|
| 2007/0073533 | A1* | 3/2007 | Thione | G06F 40/35 |
| | | | | 704/9 |
| 2009/0012778 | A1* | 1/2009 | Feng | G06F 16/3338 |
| | | | | 704/9 |
| 2009/0012926 | A1* | 1/2009 | Ishikawa | G06F 16/3334 |
| | | | | 706/47 |
| 2009/0024598 | A1* | 1/2009 | Xie | G06F 16/3349 |
| 2013/0007037 | A1* | 1/2013 | Azzam | G06F 16/3329 |
| | | | | 707/769 |
| 2014/0331241 | A1* | 11/2014 | Barbieri | H04N 21/4758 |
| | | | | 725/5 |
| 2016/0179945 | A1* | 6/2016 | Lastra Diaz | G06F 16/3334 |
| | | | | 707/739 |
| 2017/0060844 | A1* | 3/2017 | He | G06F 40/30 |
| 2017/0109355 | A1* | 4/2017 | Li | G06N 3/0445 |
| 2018/0150739 | A1* | 5/2018 | Wu | G06N 3/006 |

FOREIGN PATENT DOCUMENTS

| | | |
|---|---|---|
| CN | 103400054 A | 11/2013 |
| CN | 103902652 A | 7/2014 |

OTHER PUBLICATIONS

Tencent Technology, WO, PCT/CN2018/077488, Apr. 9, 2018, 4 pgs.
Tencent Technology, IPRP, PCT/CN2018/077488, Sep. 3, 2019, 5 pgs.

* cited by examiner

AUTOMATIC QUESTIONING AND ANSWERING PROCESSING METHOD AND AUTOMATIC QUESTIONING AND ANSWERING SYSTEM

CROSS-REFERENCE TO RELATED APPLICATIONS

This application is a continuation application of PCT/CN2018/077488, entitled "AUTOMATIC QUESTIONING AND ANSWERING PROCESSING METHOD AND AUTOMATIC QUESTIONING AND ANSWERING SYSTEM" filed on Feb. 28, 2018, which claims priority to Chinese Patent Application No. 2017101241460, filed with the Chinese Patent Office on Mar. 3, 2017 and entitled "AUTOMATIC QUESTION-ANSWER PROCESSING METHOD AND AUTOMATIC QUESTION-ANSWER SYSTEM", all of which are incorporated herein by reference in their entirety.

FIELD OF THE TECHNOLOGY

The present disclosure relates to the field of data processing, and specifically, to an automatic question-answer (QA) processing method and an automatic QA system.

BACKGROUND OF THE DISCLOSURE

An automatic QA system is a current research hotspot. The current automatic QA system is implemented mainly based on a retrieval method. Specifically, after collecting a large quantity of QA data pairs, a system performs word segmentation processing on a question text in the QA data pairs, establishes an index pair between a word obtained after the word segmentation processing and the question text, and stores the index pair in a database. After receiving a target question, the system retrieves a question text most matching the target question from the index pair in the database, returns an answer corresponding to the question text, and outputs the answer as an answer to the target question.

However, in the automatic QA system implemented based on the retrieval method, the matching of the target question is merely matching that is based on a character string similarity, and semantic proximity is not considered. In other words, even if there is a question text semantically proximate to the target question, the question text cannot be matched in the existing automatic QA system. Therefore, matching accuracy of the automatic QA system is to be enhanced.

SUMMARY

The present disclosure provides an automatic QA processing method and an automatic QA system, to improve accuracy of automatic QA processing.

In view of this, a first aspect of the present disclosure provides an automatic QA processing method performed at a server having one or more processors and memory storing a plurality of programs to be executed by the one or more processors, the method comprising:

obtaining, after receiving a target question text, a target keyword corresponding to the target question text;

determining a candidate question text that matches the target keyword;

calculating a semantic similarity value between each candidate question text and the target question text; and determining, based on the semantic similarity value, an answer corresponding to the target question text.

A second aspect of the present disclosure provides an automatic QA system having one or more processors, memory coupled to the one or more processors, and a plurality of computer-readable instructions that, when executed by the one or more processors, cause the server to perform the aforementioned automatic QA processing method.

A third aspect of the present disclosure provides a non-transitory computer readable storage medium storing a plurality of instructions in connection with a server having one or more processors. The plurality of instructions, when executed by the one or more processors, cause the server to perform the aforementioned automatic QA processing method.

According to the automatic QA processing method provided in the present disclosure, when the target question text is received, the target keyword corresponding to the target question text is obtained, and then the candidate question text that matches the target keyword is determined. Next, the semantic similarity value between each candidate question text and the target question text is calculated. Finally, the answer corresponding to the target question text is determined based on the semantic similarity value. According to the automatic QA processing method provided in the present disclosure, a semantic similarity between a target question text and each question text is considered, to finally determine an answer to the target question text, and compared with the existing technology, accuracy of automatic QA processing is improved.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following description show merely some embodiments of this application, and a person of ordinary skill in the art may derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application without creative efforts shall fall within the protection scope of this application.

Figure 1:
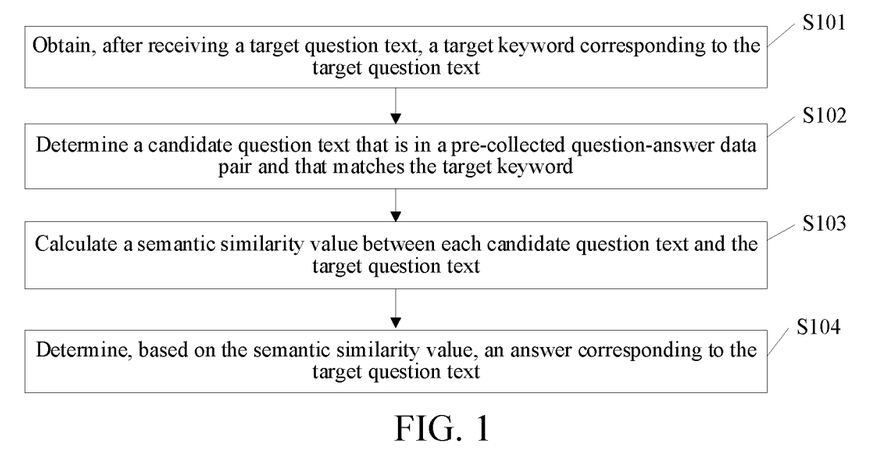
FIG. 1 is a flowchart of an automatic question-answer processing method according to an embodiment of the present invention.

The present disclosure provides an automatic QA processing method. Referring to FIG. 1, an embodiment of the automatic QA processing method provided in an embodiment of the present invention includes the following steps:

S101: Obtain, after receiving a target question text, a target keyword corresponding to the target question text.

After loading of a QA data pair is completed, a system may use the QA data pair to perform automatic QA.

When receiving the target question text, the system performs word segmentation processing on the question text, to obtain the target keyword corresponding to the target question text. Any word segmentation method or tool may be used in a process of the word segmentation processing in this embodiment of the present invention.

S102: Determine a candidate question text that is in a pre-collected QA data pair and that matches the target keyword.

An index relationship between a question text and a keyword in the QA data pair is pre-stored in the system. The index relationship may be established by the system after the QA data pair is loaded into the system, or may be obtained by the system from another device. Specifically, this is not limited in this embodiment of the present invention. After determining the target keyword, the system may determine, based on the index relationship, the candidate question text corresponding to the target keyword.

S103: Calculate a semantic similarity value between each candidate question text and the target question text.

Usually, there is a plurality of candidate question texts corresponding to the target keyword. Therefore, after determining the candidate question texts corresponding to the target question text, the system needs to find, from the plurality of candidate question texts, a candidate question text used for determining an answer to the target question text.

Specifically, in this embodiment of the present invention, various semantic similarity calculation methods may be used, to calculate the semantic similarity value between each candidate question text and the target question text, and find, based on the semantic similarity value, the candidate question text used for determining the answer to the target question text.

S104: Determine, based on the semantic similarity value, an answer corresponding to the target question text.

After the answer corresponding to the target question text is found based on the semantic similarity value, an answer corresponding to the candidate question text in the pre-loaded QA data pair is used as the answer corresponding to the target question text, to complete automatic QA processing on the target question text. According to the automatic QA processing method provided in the present disclosure, a semantic similarity between a target question text and each question text is considered, to finally determine an answer to the target question text, and compared with the existing technology, accuracy of automatic QA processing is improved.

Figure 2:
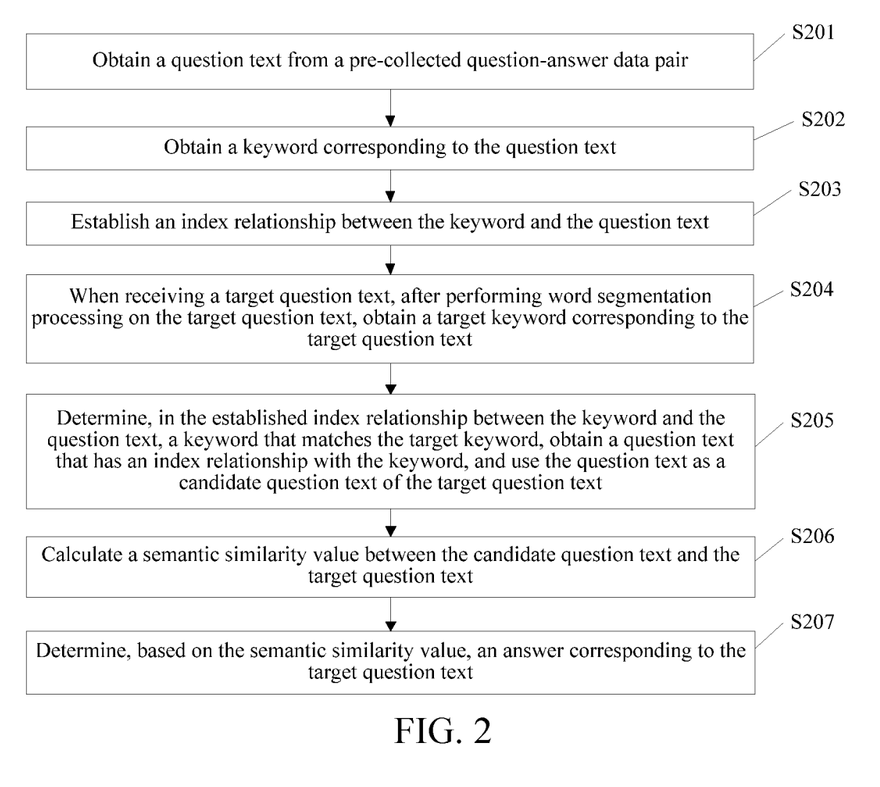
FIG. 2 is a flowchart of an automatic question-answer processing method according to an embodiment of the present invention.

The present disclosure provides an automatic QA processing method. FIG. 2 is a flowchart of an automatic QA processing method according to an embodiment of the present invention. The method may specifically include the following steps:

S201: Obtain a question text from a pre-collected QA data pair.

During actual application, a large quantity of QA data pairs are pre-collected, and used as a data basis of the automatic QA processing method. In an implementation, the QA data pairs may be collected throughout the Internet by using a crawler tool.

S202: Obtain a keyword corresponding to the question text.

In this embodiment of the present invention, the question text in the pre-collected QA data pair needs to be pre-processed. Therefore, each question text in the pre-collected QA data pair is first obtained, word segmentation processing is separately performed on each question text, and a keyword separately corresponding to each question text is obtained.

During actual application, the word segmentation processing may be performed on each obtained question text by using various existing word segmentation tools. It should be noted that, any word segmentation method or tool may be used in a process of the word segmentation processing in this embodiment of the present invention.

In this embodiment of the present invention, after the word segmentation processing is performed on the question text in the pre-collected QA data pair, the keyword corresponding to the question text is obtained. In an implementation, an individual word obtained after the word segmentation processing is performed on the question text may be directly used as the keyword corresponding to the question text.

In another optional implementation, an individual word obtained after the word segmentation processing is performed on the question text is used as a candidate word in the question text, the keyword corresponding to the question text is sifted out from the candidate word in the question text by using a particular method.

This embodiment of the present invention provides a method for sifting out the keyword corresponding to the question text from the candidate word in the question text. Specifically, a weight value separately corresponding to each candidate word in the question text is calculated, and first several candidate words with largest weight values are used as keywords corresponding to the question text. In an implementation, a weight value corresponding to each candidate word in any question text is calculated by using a classical TF-IDF feature algorithm, a classical TextRank feature algorithm, or the like. The weight value may be used for representing importance of each candidate word in the question text.

In addition, to reduce a system calculation amount, before the weight value separately corresponding to each candidate word in the question text is calculated, a preset-type word in each candidate word in the question text may be first screened out. The preset type may include a type of high-frequency oral word such as "I" or "of", a type of forbidden word on the Internet, a type of stop word, a type of modal particle, and a type of word that needs to be shielded based on a service application. In fact, even if weight values are calculated for the foregoing types of words, the weight values corresponding to these words are apparently smaller than that corresponding to another candidate word in the question text.

S203: Establish an index relationship between the keyword and the question text.

In this embodiment of the present invention, after a keyword corresponding to each question text is obtained, an index relationship between each keyword and the question text is established, so that a question text having an index relationship with a keyword can be found by using the keyword. Usually, one question text has a plurality of corresponding keywords, and two different question texts may also have a same corresponding keyword. In an optional implementation, a keyword in an established index relationship has a weight value used for representing importance of the keyword in a corresponding question text. Therefore, the index relationship in this embodiment of the present invention includes only index relationships between first N keywords with relatively large weight values in a question text and the question text, and retains only a keyword with relatively high importance in the question text, thereby reducing a quantity of keywords corresponding to the question text, to increase system query efficiency when the index relationship is queried.

Specifically, the system may establish an index relationship in the following manner: a keyword and a question text are stored in a database in a manner of key-value pair. To be specific, the keyword is used as a key, and is mapped to the database by using a hash value algorithm. An identification (ID) code of a question text corresponding to the keyword is added to a value field.

S204: When receiving a target question text, after performing word segmentation processing on the target question text, obtain a target keyword corresponding to the target question text.

In this embodiment of the present invention, after pre-processing on the question text in the pre-collected QA data pair is completed, the system may use the question text for automatic QA.

During actual application, when receiving any target question text, the system first performs word segmentation processing on the question text. Specifically, no word segmentation tool is relied upon, and any word segmentation method or tool may be used in a process of the word segmentation processing in this embodiment of the present invention. Next, a target keyword corresponding to the target question text is obtained. In an implementation, an individual word obtained after word segmentation is performed on the target question text may be directly used as the target keyword corresponding to the target question text.

In another optional implementation, screening may be performed on the individual word obtained after the word segmentation processing is performed on the target question text. For example, after a word of a preset type is screened out from the individual word, a weight value of each individual word in the target question text is calculated by using the classical TF-IDF feature algorithm or the classical TextRank feature algorithm, and finally first N individual words with largest weight values are used as the target keyword corresponding to the target question text. N is a natural number, and may be specifically set as required. Through the foregoing processing, a more accurate target keyword can be sifted out for the target question text, a quantity of recalled candidate question texts is reduced, and a quantity of system query times is reduced, further increasing automatic QA processing efficiency.

S205: Determine, in the established index relationship between the keyword and the question text, a keyword that matches the target keyword, obtain a question text that has an index relationship with the keyword, and use the question text as a candidate question text of the target question text.

In this embodiment of the present invention, after the target keyword corresponding to the target question text is obtained, the pre-established index relationship between the keyword and the question text is queried, to find the keyword (a first keyword) that matches the target keyword, obtain the question text that has the index relationship with the keyword, and use the question text as the candidate question text of the target question text. Usually, if there is a plurality of target keywords corresponding to the target question text, there is a plurality of keywords that match each target keyword, and there is a plurality of candidate question texts of the target question text that is finally obtained.

In this embodiment of the present invention, when reduction of accuracy of the keyword corresponding to each question text is avoided, an order of magnitude of the established index relationship is reduced by calculating a weight value of a candidate word of each question text, thereby improving query efficiency during automatic QA processing.

S206: Calculate a semantic similarity value between the candidate question text and the target question text.

In this embodiment of the present invention, after the candidate question text of the target question text is obtained, a candidate question text finally used for determining an answer to the target question text needs to be found from the candidate question text.

In this embodiment of the present invention, various semantic similarity calculation methods may be used, to calculate the semantic similarity value between each candidate question text and the target question text, and find, based on the semantic similarity value, the candidate question text finally used for determining the answer to the target question text.

In an implementation, semantic vectors respectively corresponding to each candidate question text and the target question text are first determined by using a pre-trained word embedding model. Specifically, word segmentation processing is separately performed on each candidate question text and the target question text, to obtain several individual words. Then, after a semantic vector corresponding to each individual word is determined by using the word embedding model, semantic vectors corresponding to individual words that belong to a same question text are accumulated, to obtain a semantic vector corresponding to the question text. The semantic vectors respectively corresponding to each candidate question text and the target question text can be calculated in the foregoing manner. For example, a semantic vector of "I" is [1,2,3,4], a semantic vector of "love" is [1,1,1,0], and a semantic vector of "you" is [−1,1,2,3]. After the accumulation, a semantic vector of "I love you" is [1,4,6,7]. Then, a vector distance between the semantic vector corresponding to each candidate question text and the semantic vector corresponding to the target question text is calculated, to obtain the semantic similarity value between each candidate question text and the target question text.

The word embedding model is a natural language processing and deep learning technology that is most widely applied currently. According to this method, a probability that a next word after a plurality of words in a sentence is a particular word is calculated, so that each word is mapped to a vector with a fixed dimension by using three layers of neural networks. In principle, it is equivalent to digitizing a word and using a vector to represent the word, so that a word similarity and a sentence similarity can be measured by using a mathematical operation. This method may be used for implementing the word embedding model in this embodiment of the present invention.

It should be understood that, an open-source word2vec tool from Google Inc. may be applied, to obtain the word embedding model in this embodiment of the present invention through training by using a QA training set. An entire training process does not need to be repeated, and a model file generated during one training may be reused for a plurality of times, without affecting system efficiency. The word2vec tool is a method for vectorizing a word by using a deep learning method. An open-source tool for the word embedding model in this embodiment of the present invention may further be another tool, in addition to the word2vec tool. Specifically, this is not limited herein.

It should be further understood that, in this embodiment of the present invention, the semantic similarity value between the candidate question text and the target question text may be further calculated by using a model other than the word embedding model, for example, a recurrent neural network (RNN) model or a translation (seq2seq) model.

In this embodiment of the present invention, a manner of calculating the semantic similarity value between each candidate question text and the target question text is not limited to the foregoing method.

S207: Determine, based on the semantic similarity value, an answer corresponding to the target question text.

In this embodiment of the present invention, after the semantic similarity value between each candidate question text and the target question text is calculated, a candidate question text corresponding to a largest semantic similarity value is used as a candidate question text used for determining the answer corresponding to the target question text. An answer corresponding to the candidate question text in the pre-collected QA data pair is used as the answer corresponding to the target question text, to complete automatic QA processing on the target question text.

In addition, in this embodiment of the present invention, to improve accuracy of the automatic QA processing, a character string similarity between each candidate question text and the target question text may be further calculated, and finally the answer corresponding to the target question text is determined with reference to the semantic similarity value and the character string similarity value.

In an implementation, the system may further calculate an editing distance between each candidate question text and the target question text, and separately use the editing distance as a character string similarity value between each candidate question text and the target question text. The semantic similarity value and the character string similarity value that correspond to each candidate question text are used as inputs into a pre-established classification model, and then are processed by the classification model, to obtain the candidate question text that is finally used for determining the answer to the target question text, that is, a candidate question text that most matches the target question text. An answer corresponding to the candidate question text is the answer corresponding to the target question text. The pre-established classification model may be a multi-dimensional similarity measurement model, or another model. Specifically, this is not limited in this embodiment of the present invention.

In this embodiment of the present invention, another similarity between each candidate question text and the target question text may be further calculated, for example, a cosine similarity, a convolutional similarity that is based on a convolutional neural network (CNN), a Hamming distance similarity, or a Jaccard coefficient similarity, so that the answer corresponding to the target question text is determined with reference to each similarity, further improving the accuracy of the automatic QA processing.

In addition, in this embodiment of the present invention, a keyword weight value difference between each candidate question text and the target question text may be further used as a similarity calculation method. Specifically, a sum of a keyword weight value corresponding to each candidate question text is calculated, and a sum of a keyword weight value corresponding to the target question text is calculated. Then, a respective difference between the sum of the keyword weight value corresponding to each candidate question text and the sum of the keyword weight value corresponding to the target question text is calculated, to represent the similarity of each candidate question text. In fact, a smaller difference corresponds to a larger similarity that is between a candidate question text and the target question text.

In summary, according to the automatic QA processing method provided in this embodiment of the present invention, the question text is first obtained from the pre-collected QA data pair. Next, the word segmentation processing is performed on the question text, to obtain the keyword corresponding to the question text. Then, the index relationship between the keyword and the question text is established. When any target question text is received, the target keyword corresponding to the target question text is obtained after the word segmentation processing is performed on the target question text. Then, the keyword that matches the target keyword is determined in the established index relationship between the keyword and the question text, the question text that has the index relationship with the keyword is obtained, and the question text is used as the candidate question text of the target question text. Further, the semantic similarity value between the candidate question text and the target question text is calculated. Finally, the answer corresponding to the target question text is determined based on the semantic similarity value. According to the automatic QA processing method provided in this embodiment of the present invention, the semantic similarity between the target question text and each question text is considered, to finally determine the answer to the target question text, and compared with the existing technology, the accuracy of the automatic QA processing is improved.

In addition, in this embodiment of the present invention, the weight value of the candidate word of the question text is calculated, so that not only accuracy is ensured, but also the quantity of keywords corresponding to each question text is further reduced, and the order of magnitude of the index relationship is reduced, improving the query efficiency during a process of the automatic QA processing.

Figure 3:
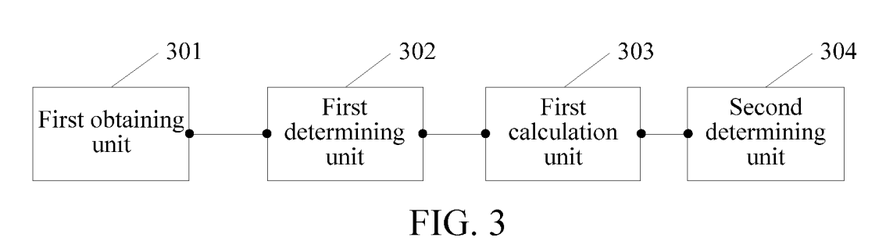
FIG. 3 is a schematic structural diagram of an automatic question-answer system according to an embodiment of the present invention.

The foregoing describes the automatic QA processing method in this embodiment of the present invention. The following describes an automatic QA system according to an embodiment of the present invention. FIG. 3 is a schematic structural diagram of the automatic QA system according to this embodiment of the present invention. The system includes:

a first obtaining unit 301, configured to obtain, after receiving a target question text, a target keyword corresponding to the target question text;

a first determining unit 302, configured to determine a candidate question text that matches the target keyword;

a first calculation unit 303, configured to calculate a semantic similarity value between each candidate question text and the target question text; and a second determining unit 304, configured to determine, based on the semantic similarity value, an answer corresponding to the target question text.

According to the automatic QA system provided in the present disclosure, a semantic similarity between a target question text and each question text is considered, to finally determine an answer to the target question text, and compared with the existing technology, accuracy of automatic QA processing is improved.

Figure 4:
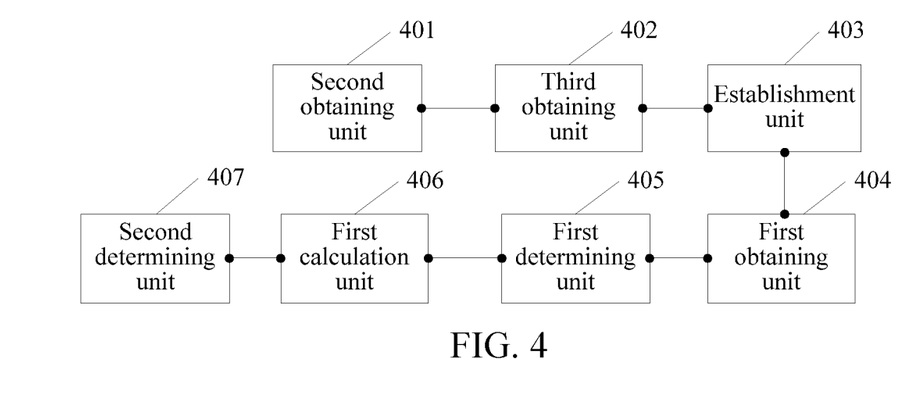
FIG. 4 is a schematic structural diagram of an automatic question-answer system according to an embodiment of the present invention.

An embodiment of the present invention further provides an automatic QA system. FIG. 4 is a schematic structural diagram of the automatic QA system according to this embodiment of the present invention. The system includes:

a second obtaining unit 401, configured to obtain a question text from a pre-collected QA data pair;

a third obtaining unit 402, configured to obtain a keyword corresponding to the question text;

an establishment unit 403, configured to establish an index relationship between the keyword and the question text;

a first obtaining unit 404, configured to obtain, after receiving a target question text, a target keyword corresponding to the target question text;

a first determining unit 405, configured to: determine, in the established index relationship between the keyword and the question text, a keyword that matches the target keyword, obtain a question text that has an index relationship with the keyword, and use the question text as a candidate question text of the target question text;

a first calculation unit 406, configured to calculate a semantic similarity value between each candidate question text and the target question text; and a second determining unit 407, configured to determine, based on the semantic similarity value, an answer corresponding to the target question text.

Specifically, the third obtaining unit may include:

a second word segmentation subunit, configured to perform word segmentation processing on the question text, to obtain a candidate word in the question text;

a second calculation subunit, configured to calculate a weight value separately corresponding to each candidate word in the question text; and a second determining subunit, configured to determine first N candidate words with largest weight values as the keyword corresponding to the question text, where N is a natural number.

In addition, to improve processing efficiency of the system, the third obtaining unit may further include:

a second screening-out subunit, configured to screen out a word of a preset type in the candidate word, where the preset type includes a type of high-frequency oral word.

Specifically, the first obtaining unit includes:

a first word segmentation subunit, configured to perform word segmentation processing on the target question text when receiving the target question text, to obtain a target candidate word in the target question text;

a first calculation subunit, configured to calculate a weight value separately corresponding to each target candidate word in the target question text; and a first determining subunit, configured to determine first M candidate words with largest weight values as the target keyword corresponding to the target question text, where M is a natural number.

To improve processing efficiency of the system, the third obtaining unit may further include:

a first screening-out subunit, configured to screen out a word of a preset type in the target candidate word, where the preset type includes a type of oral word or a type of high-frequency word.

In an implementation, the first calculation unit may include:

a third determining subunit, configured to determine, by using a pre-trained word embedding model, semantic vectors respectively corresponding to the candidate question text and the target question text; and a third calculation subunit, configured to: calculate, for each candidate question text, a vector distance between the semantic vector corresponding to the candidate question text and the semantic vector corresponding to the target question text, and use the vector distance as the semantic similarity value between the candidate question text and the target question text.

Correspondingly, the second determining unit is specifically configured to use, as the answer corresponding to the target question text, an answer corresponding to a candidate question text corresponding to a maximum semantic similarity value in the pre-collected QA data pair.

To improve accuracy of the automatic QA system, the system may further include:

a second calculation unit, configured to: calculate, for each candidate question text, an editing distance between the candidate question text and the target question text, and use the editing distance as a character string similarity value between the candidate question text and the target question text.

Correspondingly, the second determining unit is specifically configured to determine, with reference to the semantic similarity value and the character string similarity value between the candidate question text and the target question text, the answer corresponding to the target question text.

The automatic QA system provided in this embodiment of the present invention can implement the following function: obtaining the question text from the pre-collected QA data pair. The word segmentation processing is performed on the question text, to obtain the keyword corresponding to the question text. The index relationship between the keyword and the question text is established. When any target question text is received, the target keyword corresponding to the target question text is obtained after the word segmentation processing is performed on the target question text. Then, the keyword that matches the target keyword is determined in the established index relationship between the keyword and the question text, the question text that has the index relationship with the keyword is obtained, and the question text is used as the candidate question text of the target question text. The semantic similarity value between the candidate question text and the target question text is calculated. The answer corresponding to the target question text is determined based on the semantic similarity value. According to the automatic QA system provided in this embodiment of the present invention, the semantic similarity between the target question text and each question text is considered, to finally determine the answer to the target question text, and compared with the existing technology, the accuracy of the automatic QA processing is improved.

In addition, in this embodiment of the present invention, the weight value of the candidate word of the question text is calculated, so that not only accuracy is ensured, but also the quantity of keywords corresponding to each question text is further reduced, and the order of magnitude of the index relationship is reduced, improving the query efficiency during a process of the automatic QA processing.

The automatic QA system in this embodiment of the present invention may be any computer device, for example, a service system that can implement automatic QA.

Figure 5:
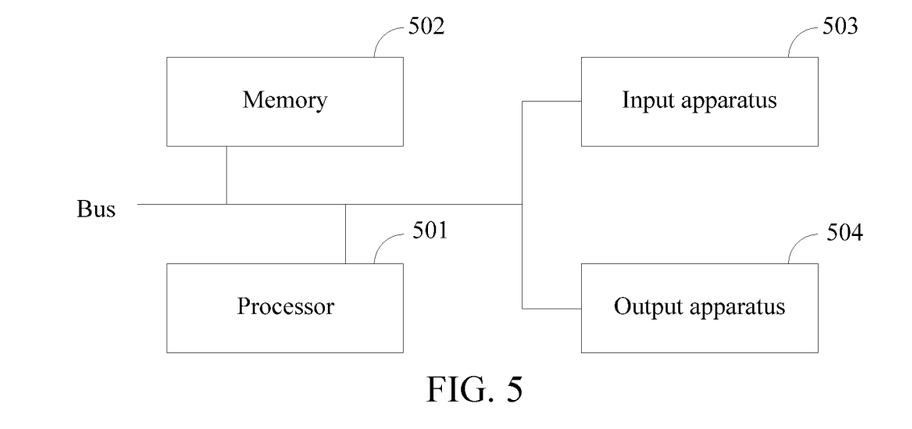
FIG. 5 is a part of a schematic structural diagram of a computer according to an embodiment of the present invention.

Correspondingly, an embodiment of the present invention further provides a computer device. Referring to FIG. 5, the computer device may include:

a processor 501, a memory 502, an input apparatus 503, and an output apparatus 504. There may be one or more processors 501 in a browser server. In FIG. 3, one processor is used as an example. In some embodiments of the present disclosure, the processor 501, the memory 502, the input apparatus 503, and the output apparatus 504 may be connected by using a bus or in another manner. In FIG. 5, an example in which connection is performed by using a bus is used.

The memory 502 may be configured to store a software program and module, and the processor 501 runs the software program and module stored in the memory 502. The memory 502 may mainly include a program storage area and a data storage area. The program storage area may store an operating system, an application program required by at least one function, or the like. In addition, the memory 502 may include a high-speed random access memory, and may further include a non-volatile memory such as at least one magnetic disk storage device or a flash memory device, or another volatile solid storage device. The input apparatus 503 may be configured to: receive input digit or character information, and generate a key signal input related to a user setting and function control of the browser server.

Specifically, in this embodiment, the processor 501 loads executable files corresponding to processes of one or more application programs into the memory 502 according to the following instructions, and the processor 501 runs the application programs stored in the memory 502, thereby implementing various functions:

obtaining, after receiving a target question text, a target keyword corresponding to the target question text;

determining a candidate question text that is in a pre-collected QA data pair and that matches the target keyword;

calculating a semantic similarity value between each candidate question text and the target question text; and determining, based on the semantic similarity value, an answer corresponding to the target question text.

Optionally, in some embodiments, the processor is specifically configured to perform word segmentation processing on the target question text when receiving the target question text, to obtain a target candidate word in the target question text;

calculate a weight value separately corresponding to each target candidate word in the target question text; and determine first M candidate words with largest weight values as the target keyword corresponding to the target question text, where M is a natural number.

Optionally, in some embodiments, the processor is further configured to screen out a word of a preset type in the target candidate word.

Optionally, in some embodiments, the processor is further configured to: obtain a question text from the pre-collected QA data pair;

obtain a keyword corresponding to the question text;

establish an index relationship between the keyword and the question text; and determine, in the established index relationship between the keyword and the question text, a first keyword that matches the target keyword, obtain a question text that has an index relationship with the first keyword, and use the question text as a candidate question text of the target question text.

Optionally, in some embodiments, the processor is specifically configured to:

perform word segmentation processing on the question text, to obtain a candidate word in the question text;

calculate a weight value separately corresponding to each candidate word in the question text; and determine first N candidate words with largest weight values as the keyword corresponding to the question text, where N is a natural number.

Optionally, in some embodiments, the processor is further configured to screen out a word of a preset type in the candidate word.

Optionally, in some embodiments, the processor is specifically configured to determine, by using a pre-trained word embedding model, semantic vectors respectively corresponding to each candidate question text and the target question text.

A vector distance between the semantic vector corresponding to the candidate question text and the semantic vector corresponding to the target question text is calculated for each candidate question text, and the vector distance is used as the semantic similarity value between the candidate question text and the target question text.

Optionally, in some embodiments, the processor is specifically configured to use, as the answer corresponding to the target question text, an answer corresponding to a candidate question text corresponding to a maximum semantic similarity value in the pre-collected QA data pair.

Optionally, in some embodiments, the processor is specifically configured to: calculate, for each candidate question text, an editing distance between the candidate question text and the target question text, and use the editing distance as a character string similarity value between the candidate question text and the target question text; and determine, with reference to the semantic similarity value and the character string similarity value between the candidate question text and the target question text, the answer corresponding to the target question text.

The apparatus embodiments basically correspond to the method embodiments, and therefore, reference may be made to the method embodiments for the associated part. The apparatus embodiments described above are merely schematic. The units described as separate parts may be or may not be physically apart. The parts displayed as units may be or may not be physical units, in other words, may be located at a same place, or may be distributed onto a plurality of network units. Some or all modules thereof may be selected based on an actual requirement, to implement an objective of the solution in this embodiment. A person of ordinary skill in the art may understand and implement the objective without creative efforts.

It should be noted that the relational terms herein such as first and second are used only to differentiate an entity or operation from another entity or operation, and do not require or imply any actual relationship or sequence between these entities or operations. Moreover, the terms "include", "comprise", and any variants thereof are intended to cover a non-exclusive inclusion. Therefore, in the context of a process, a method, an object, or an apparatus that includes a series of elements, the process, method, object, or apparatus not only includes such elements, but also includes other elements not specified expressly, or may include inherent elements of the process, method, object, or apparatus. Unless otherwise specified, an element limited by "include a/an . . . " does not exclude other same elements existing in the process, the method, the article, or the device that includes the element.

The foregoing describes in detail an automatic QA processing method and an automatic QA system provided in embodiments of the present invention. Principles and implementations of the present disclosure are described in this document by using specific examples. The descriptions in the foregoing embodiments are merely used for helping understand the method of the present disclosure and a core idea thereof. In addition, for a person of ordinary skill in the art, based on an idea of the present disclosure, there are changes in the specific implementations and the application scope. In summary, the content of this specification should not be understood as a limitation to the present disclosure.

What is claimed is:

1. An automatic question-answer (QA) processing method performed at a computing device having one or more processors and memory storing a plurality of programs to be executed by the one or more processors, the method comprising:
obtaining, after receiving a target question text, a target keyword corresponding to the target question text;
determining candidate question texts that match the target keyword by (i) identifying question texts in a pre-collected QA data pair using a pre-established inverse index relationship between the target keyword and the question texts, each question text having an associated answer and a weight value corresponding to the target keyword, and (ii) selecting top N of the question texts according to their associated weight values as the candidate question texts, that match the target keyword, wherein N is greater than 1;
calculating a semantic similarity value between each of the candidate question texts and the target question text;
determining, from the pre-collected QA data pair, an answer associated with one of the candidate question texts corresponding to the target question text having a highest semantic similarity value, and
before obtaining a target keyword corresponding to the target question text:
obtaining a question text from the pre-collected QA data pair;
obtaining a keyword corresponding to the question text; and
establishing an index relationship between the keyword and the question text; and
the operation of determining a candidate question text that is in a pre-collected QA data pair and that matches the target keyword comprises:
determining, in the established index relationship between the keyword and the question text, a first keyword that matches the target keyword, obtaining a question text that has an index relationship with the first keyword, and using the question text as a candidate question text of the target question text.

2. The automatic QA processing method according to claim 1, wherein the operation of obtaining a target keyword corresponding to the target question text comprises:
performing word segmentation processing on the target question text, to obtain a target candidate word in the target question text;
calculating a weight value separately corresponding to each target candidate word in the target question text; and
determining first M candidate words with largest weight values as the target keyword corresponding to the target question text, wherein M is a natural number.

3. The automatic QA processing method according to claim 2, further comprising:
before calculating a weight value separately corresponding to each target candidate word in the target question text:
screening out a word of a preset type in the target candidate word.

4. The automatic QA processing method according to claim 1, wherein the operation of obtaining a keyword corresponding to the question text comprises:
performing word segmentation processing on the question text, to obtain a candidate word in the question text;
calculating a weight value separately corresponding to each candidate word in the question text; and
determining first N candidate words with largest weight values as the keyword corresponding to the question text, wherein N is a natural number.

5. The automatic QA processing method according to claim 1, wherein the operation of calculating a semantic similarity value between each candidate question text and the target question text comprises:
determining, by using a pre-trained word embedding model, semantic vectors respectively corresponding to each candidate question text and the target question text; and
calculating, for each candidate question text, a vector distance between the semantic vector corresponding to the candidate question text and the semantic vector corresponding to the target question text, and using the vector distance as the semantic similarity value between the candidate question text and the target question text.

6. The automatic QA processing method according to claim 5, wherein the operation of determining, based on the semantic similarity value, an answer corresponding to the target question text comprises:
using, as the answer corresponding to the target question text, an answer corresponding to a candidate question text corresponding to a maximum semantic similarity value in the pre-collected QA data pair.

7. The automatic QA processing method according to claim 1, further comprising:
calculating, for each candidate question text, an editing distance between the candidate question text and the target question text, and using the editing distance as a character string similarity value between the candidate question text and the target question text; and
the operation of determining, based on the semantic similarity value, an answer corresponding to the target question text comprises:
determining, with reference to the semantic similarity value and the character string similarity value between the candidate question text and the target question text, the answer corresponding to the target question text.

8. An automatic question-answer (QA) system, comprising:
one or more processors;
memory coupled to the one or more processors; and
a plurality of computer-readable instructions that, when executed by the one or more processors, cause the server to perform the following operations:
obtaining, after receiving a target question text, a target keyword corresponding to the target question text;
determining candidate question texts that match the target keyword by (i) identifying question texts in a pre-collected QA data pair using a pre-established inverse index relationship between the target keyword and the question texts, each question text having an associated answer and a weight value corresponding to the target keyword, and (ii) selecting top N of the question texts according to their associated weight values as the candidate question texts, that match the target keyword, wherein N is greater than 1;
calculating a semantic similarity value between each of the candidate question texts and the target question text;

determining, from the pre-collected QA data pair, an answer associated with one of the candidate question texts corresponding to the target question text having a highest semantic similarity value;

before obtaining a target keyword corresponding to the target question text:

obtaining a question text from the pre-collected QA data pair;

obtaining a keyword corresponding to the question text; and establishing an index relationship between the keyword and the question text; and the operation of determining a candidate question text that is in a pre-collected QA data pair and that matches the target keyword comprises:

determining, in the established index relationship between the keyword and the question text, a first keyword that matches the target keyword, obtaining a question text that has an index relationship with the first keyword, and using the question text as a candidate question text of the target question text.

9. The automatic QA system according to claim 8, wherein the operation of obtaining a target keyword corresponding to the target question text comprises:

performing word segmentation processing on the target question text, to obtain a target candidate word in the target question text;

calculating a weight value separately corresponding to each target candidate word in the target question text; and determining first M candidate words with largest weight values as the target keyword corresponding to the target question text, wherein M is a natural number.

10. The automatic QA system according to claim 9, wherein the operations further comprise:

before calculating a weight value separately corresponding to each target candidate word in the target question text:

screening out a word of a preset type in the target candidate word.

11. The automatic QA system according to claim 8, wherein the operation of obtaining a keyword corresponding to the question text comprises:

performing word segmentation processing on the question text, to obtain a candidate word in the question text;

calculating a weight value separately corresponding to each candidate word in the question text; and determining first N candidate words with largest weight values as the keyword corresponding to the question text, wherein N is a natural number.

12. The automatic QA system according to claim 8, wherein the operations further comprise: wherein the operation of calculating a semantic similarity value between each candidate question text and the target question text comprises:

determining, by using a pre-trained word embedding model, semantic vectors respectively corresponding to each candidate question text and the target question text; and calculating, for each candidate question text, a vector distance between the semantic vector corresponding to the candidate question text and the semantic vector corresponding to the target question text, and using the vector distance as the semantic similarity value between the candidate question text and the target question text.

13. The automatic QA system according to claim 12, wherein the operation of determining, based on the semantic similarity value, an answer corresponding to the target question text comprises:

using, as the answer corresponding to the target question text, an answer corresponding to a candidate question text corresponding to a maximum semantic similarity value in the pre-collected QA data pair.

14. The automatic QA system according to claim 8, wherein the operations further comprise:

calculating, for each candidate question text, an editing distance between the candidate question text and the target question text, and using the editing distance as a character string similarity value between the candidate question text and the target question text; and the operation of determining, based on the semantic similarity value, an answer corresponding to the target question text comprises:

determining, with reference to the semantic similarity value and the character string similarity value between the candidate question text and the target question text, the answer corresponding to the target question text.

15. A non-transitory computer readable storage medium storing a plurality of instructions in connection with a computing device having one or more processors, wherein the plurality of instructions, when executed by the one or more processors, cause the server to perform a plurality of operations including:

obtaining, after receiving a target question text, a target keyword corresponding to the target question text;

determining candidate question texts that match the target keyword by (i) identifying question texts in a pre-collected QA data pair using a pre-established inverse index relationship between the target keyword and the question texts, each question text having an associated answer and a weight value corresponding to the target keyword, and (ii) selecting top N of the question texts according to their associated weight values as the candidate question texts, that match the target keyword, wherein N is greater than 1;

calculating a semantic similarity value between each of the candidate question texts and the target question text;

determining, from the pre-collected QA data pair, an answer associated with one of the candidate question texts corresponding to the target question text having a highest semantic similarity value, before obtaining a target keyword corresponding to the target question text:

obtaining a question text from the pre-collected QA data pair;

obtaining a keyword corresponding to the question text; and establishing an index relationship between the keyword and the question text; and the operation of determining a candidate question text that is in a pre-collected QA data pair and that matches the target keyword comprises:

determining, in the established index relationship between the keyword and the question text, a first keyword that matches the target keyword, obtaining a question text that has an index relationship with the first keyword, and using the question text as a candidate question text of the target question text.

16. The non-transitory computer readable storage medium according to claim 15, wherein the operation of obtaining a target keyword corresponding to the target question text comprises:
- performing word segmentation processing on the target question text, to obtain a target candidate word in the target question text;
- calculating a weight value separately corresponding to each target candidate word in the target question text; and
- determining first M candidate words with largest weight values as the target keyword corresponding to the target question text, wherein M is a natural number.

17. The non-transitory computer readable storage medium according to claim 15, wherein the operations further comprise: wherein the operation of calculating a semantic similarity value between each candidate question text and the target question text comprises:
- determining, by using a pre-trained word embedding model, semantic vectors respectively corresponding to each candidate question text and the target question text; and
- calculating, for each candidate question text, a vector distance between the semantic vector corresponding to the candidate question text and the semantic vector corresponding to the target question text, and using the vector distance as the semantic similarity value between the candidate question text and the target question text.

* * * * *